(12) United States Patent
Testa

(10) Patent No.: US 12,466,493 B2
(45) Date of Patent: Nov. 11, 2025

(54) BODYWORK FOR A MOTOR VEHICLE

(71) Applicant: FERRARI S.P.A., Modena (IT)

(72) Inventor: Daniele Testa, Modena (IT)

(73) Assignee: FERRARI S.P.A., Modena (IT)

( * ) Notice: Subject to any disclaimer, the term of this patent is extended or adjusted under 35 U.S.C. 154(b) by 413 days.

(21) Appl. No.: 18/159,496

(22) Filed: Jan. 25, 2023

(65) Prior Publication Data

US 2023/0249754 A1 Aug. 10, 2023

(30) Foreign Application Priority Data

Feb. 10, 2022 (IT) .......................... 102022000002405

(51) Int. Cl.
*B62D 25/08* (2006.01)
*B60H 1/28* (2006.01)

(52) U.S. Cl.
CPC ............ *B62D 25/081* (2013.01); *B60H 1/28* (2013.01)

(58) Field of Classification Search
CPC .. B60H 1/00507; B60H 1/00564; B60H 1/28; B62D 21/17; B62D 25/081; B62D 25/12; B62D 25/142
See application file for complete search history.

(56) References Cited

U.S. PATENT DOCUMENTS

2016/0221611 A1 8/2016 Wolf et al.
2020/0247478 A1* 8/2020 Kehimkar ............ B62D 25/142

FOREIGN PATENT DOCUMENTS

| AU | 2002250119 A1 * | 9/2003 | ........... B60H 1/0055 |
| JP | S577767 A | 1/1982 | |
| JP | S61249875 A | 11/1986 | |
| JP | H06278653 A | 10/1994 | |

OTHER PUBLICATIONS

FR2630391A1 (Year: 1989).*
Italian Search Report for Application No. 102022000002405; Filing Date—Feb. 10, 2022; Date of Mailing—Sep. 26, 2022, 8 pages.

* cited by examiner

*Primary Examiner* — Lori Lyjak
(74) *Attorney, Agent, or Firm* — CANTOR COLBURN LLP

(57) ABSTRACT

A bodywork for a motor vehicle includes a frame to fix and surround a windshield of the motor vehicle. The frame comprises a crossbar to constitute a support base for the windshield, and a pair of uprights respectively fixed at opposite ends of the crossbar so as to form an area with a closed contour for placing the windshield. The crossbar comprises a first wall facing away from the opposite side to the area. A duct extends through the crossbar between a first opening obtained on a second wall of the crossbar and a second opening obtained on the first wall.

15 Claims, 3 Drawing Sheets

BODYWORK FOR A MOTOR VEHICLE

CROSS-REFERENCE TO RELATED APPLICATIONS

This patent application claims priority from Italian patent application no. 102022000002405 filed on Feb. 10, 2022, the entire disclosure of which is incorporated herein by reference.

TECHNICAL FIELD

The invention concerns a bodywork for a motor vehicle, in particular a sports car.

PRIOR ART

As known, a motor vehicle has a bodywork that includes a module defining the passenger compartment of the motor vehicle.

In some cases, the module includes a front portion intended to support and house air conditioning equipment to air condition the passenger compartment.

Thus, the front portion comprises a housing that contains the air conditioning equipment.

The housing must be open, i.e., it must be able to communicate with the outside via an air intake, which is essential for the operation of the air conditioning equipment.

In fact, the air conditioning equipment conditions an airflow that enters the housing, from the outside of the motor vehicle, via the air intake.

Normally, the air intake is located above the air conditioning equipment arranged in the housing.

Necessarily, the air intake can never be totally or almost obstructed by elements of the bodywork, since the air conditioning equipment needs at least a certain minimum quantity of incoming air flow to be able to function correctly.

This constitutes a drawback in terms of freedom of design of the bodywork, since it represents a constraint on the form and dimensions of some elements of the bodywork or of the module.

For example, one of the latter elements is the typical crossbar designed to support, or act as a base for, the windshield of the motor vehicle.

In particular, this crossbar, usually having a curved shape or, more precisely, a wedge shape, must have limited dimensions along the motor vehicle's forward direction, to avoid totally covering the air intake.

In light of the above, there is a need to improve known motor vehicles, in particular overcoming the above-mentioned drawback.

One purpose of the invention is to respond to the need described above, preferably in a simple and reliable way.

DESCRIPTION OF THE INVENTION

The purpose is achieved with a front frame assembly for a motor vehicle as defined in claim 1.

The dependent claims define particular embodiments of the invention.

BRIEF DESCRIPTION OF THE DRAWINGS

Below, an embodiment of the invention will be described to better understand the same by way of non-limiting example and with reference to the attached drawings in which.

EMBODIMENTS OF THE INVENTION

Figure 1:
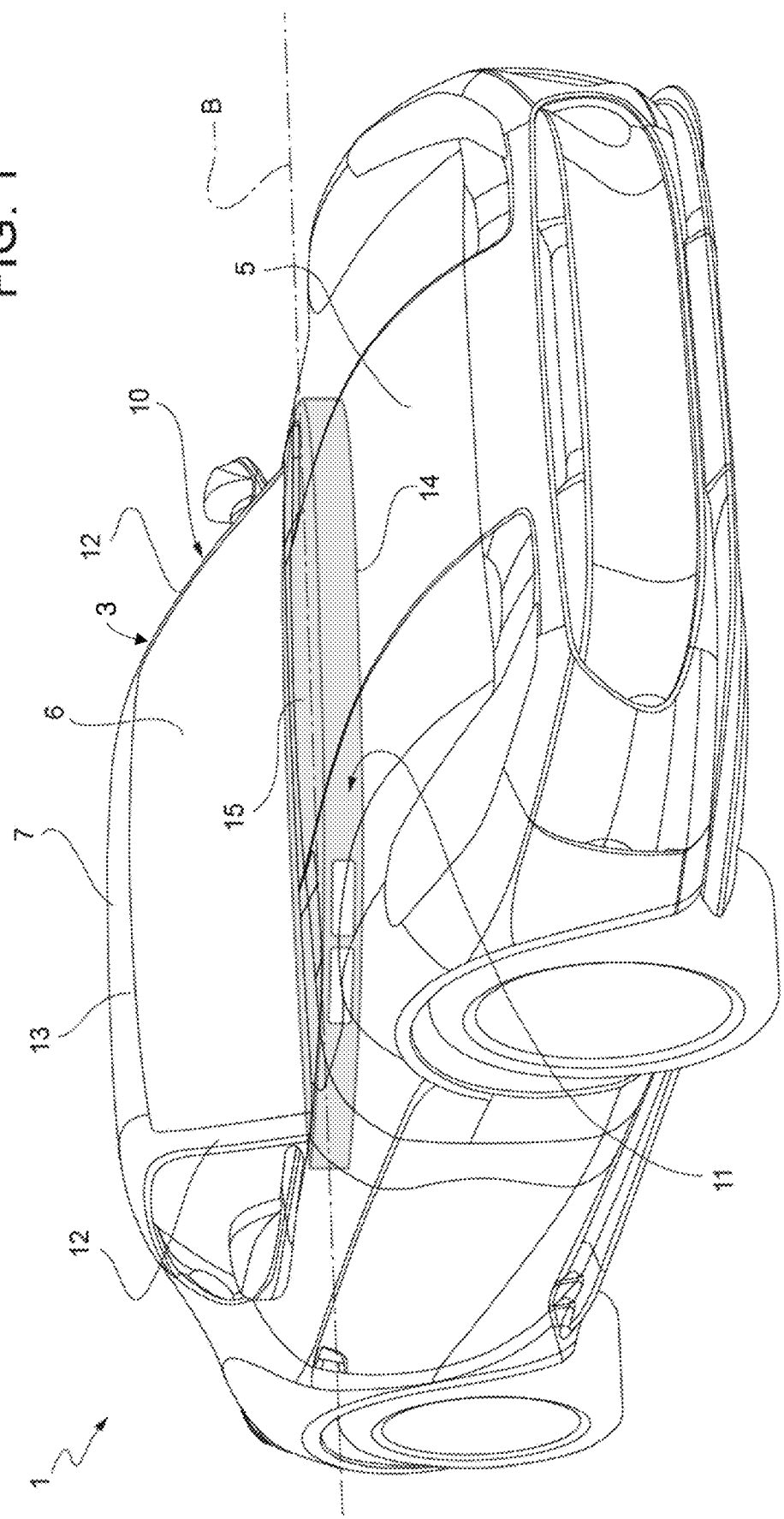
FIG. 1 is a perspective view of a motor vehicle comprising a bodywork according to the invention.

In FIG. 1, the reference number 1 is used to indicate, as a whole, a motor vehicle.

Like all motor vehicles, the motor vehicle 1 has a normal forward direction and comprises a passenger compartment 2 to receive at least one driver and, potentially, one or more passengers.

The motor vehicle 1 comprises a bodywork 3, in turn comprising a module 4, which defines or surrounds the passenger compartment. For example, the module 4 may be monolithic. In addition, the module 4 may comprise or be made of carbon fibre.

In addition, the motor vehicle 1 includes multiple external panels, i.e., visible from the outside of the motor vehicle 1, such as a hood 5, a windshield 6, and possibly a roof 7. The external panels are supported in a fixed position by the bodywork 3, i.e., are fixed in relation thereto, more precisely fixed thereto.

In this case, the hood 5 is a front hood, according to the forward direction of the motor vehicle 1.

The bodywork 3 also comprises a frame 10 that surrounds the windshield 6. The latter is fixed to the frame 10 at an area with a closed contour defined by the frame 10. Thus, the windshield 6 is surrounded by the same closed contour.

The frame 10 comprises a crossbar 11 constituting a support base to support the windshield 6. In other words, the windshield 6 is arranged below the windshield 6.

In addition, the crossbar 11 projects in relation to the windshield 6, along the forward direction of the motor vehicle 1, in particular in front of the windshield 6.

The crossbar 11 is at least in part or entirely covered by the hood 5.

The crossbar 11 comprises, or more precisely is, a beam, in particular a box-shaped one, more precisely with a greater extension widthwise, i.e., along a direction B orthogonal to the forward direction and transversal in relation to the sides of the motor vehicle 1.

In detail, since the windshield 6 extends according to a curved and concave surface towards the passenger compartment 2, the crossbar 11 has a curved shape, in particular with a bending radius belonging to a plane defined by the direction B and by the forward direction. This is not, in any case, essential, since both the windshield 6 and the crossbar 11 may have different shapes, without any loss of generality thereby.

In addition, the frame 10 comprises a pair of uprights 12 respectively fixed to lateral opposite ends of the crossbar 11, i.e., opposite ends in relation to the direction B.

The uprights 12 extend transversely in relation to the crossbar 11, in particular upwards, so as to form the above-mentioned area with a closed contour to position the windshield 6.

Optionally, the closed contour is completed by an additional crossbar 13 of the frame 10 extending parallel to the axis B. The additional crossbar 13 has two lateral ends, i.e., according to the axis B, fixed to the uprights 12.

In particular, the crossbar 13 also supports the roof 7. The crossbar 13 is arranged above the uprights 12 and clearly also above the crossbar 11. If the motor vehicle 1 is a convertible or has no roof 7, the crossbar 13 could be, as a result, absent, without, however, the area for positioning the windshield 6 being modified. In fact, the closed contour may also be defined by the area for positioning the windshield 6 and not necessarily by the frame 10.

The crossbar 11 comprises multiple walls, which include at least one wall 14 facing downwards or on the opposite side to the windshield 6 and, as a result, to the area for positioning the windshield 6.

In detail, the wall 14 is opposite, i.e., facing the opposite direction to another wall 15 of the crossbar 11; the other wall 15 may support the windshield 6, i.e., form a base for the windshield 6.

The crossbar 11 also comprises a wall 16 (FIG. 2) that is transversal to both other walls 14, 15 and faces the passenger compartment 2.

In addition, the crossbar 11 comprises a wall 17, which is transversal to the wall 14 and, in detail, also to the wall 15.

The wall 17 extends so as to be transversely incident to the wall 14.

In particular, the wall 17 is curved, more specifically according to the above-mentioned bending radius. In the embodiment illustrated, the wall 17 is a portion of a side wall of a cylinder. The axis of the cylinder is directed upwards, i.e., it is orthogonal to a level surface (not illustrated) of the bodywork 3.

The wall 17 is in front of the windshield 6 or the wall 16. In addition, as a result, the wall 17 faces the opposite side to the wall 16.

Implicitly, the wall 17 faces the opposite side to the passenger compartment.

According to the invention, the bodywork 3 comprises a duct 20 extending through the crossbar 11.

The duct 20 extends between an opening 21 formed on the wall 17 and an opening 22 formed on the wall 14.

More precisely, the duct 20 is defined by a chamber completely inside the crossbar 11.

The chamber is open through the openings 21, 22. In particular, the wall 17 has another opening 21, for example placed side-by-side and, in detail, identical to the preceding one.

The openings 21 communicate with the environment outside the motor vehicle 1 so as to admit air into the duct 20. In fact, the openings 21 communicate, in particular directly, with an engine compartment of the motor vehicle 1 covered by the hood 5. As in all motor vehicles, the engine compartment of the motor vehicle 1 communicates with the outside.

Potentially, the crossbar 11 may have ribs inside the chamber or duct 20 with the function of strengthening or increasing the stress resistance of the crossbar 11, which, inevitably, is lightly, structurally weakened by the presence of the duct 20. In fact, the ribbing is enough to totally compensate for the slight weakening caused by the presence of the duct 20.

For example, each ribbing can extend from any of the walls 14, 15 towards the other wall 14, 15 or be directly connected to both the walls 14, 15, thus defining a partition. The partition could also delimit the chamber or duct 20, i.e., define a wall of the chamber or duct 20.

The wall 14 preferably comprises a portion 23 that is concave downwards, i.e., towards the opposite wall to the area for positioning the windshield 6.

In particular, the opening 22 is formed on the portion 23.

As will be clearer below, the portion 23 defines a recess of the wall 14; in turn, the recess has the function of a seat for introducing objects or devices there.

Figure 3:
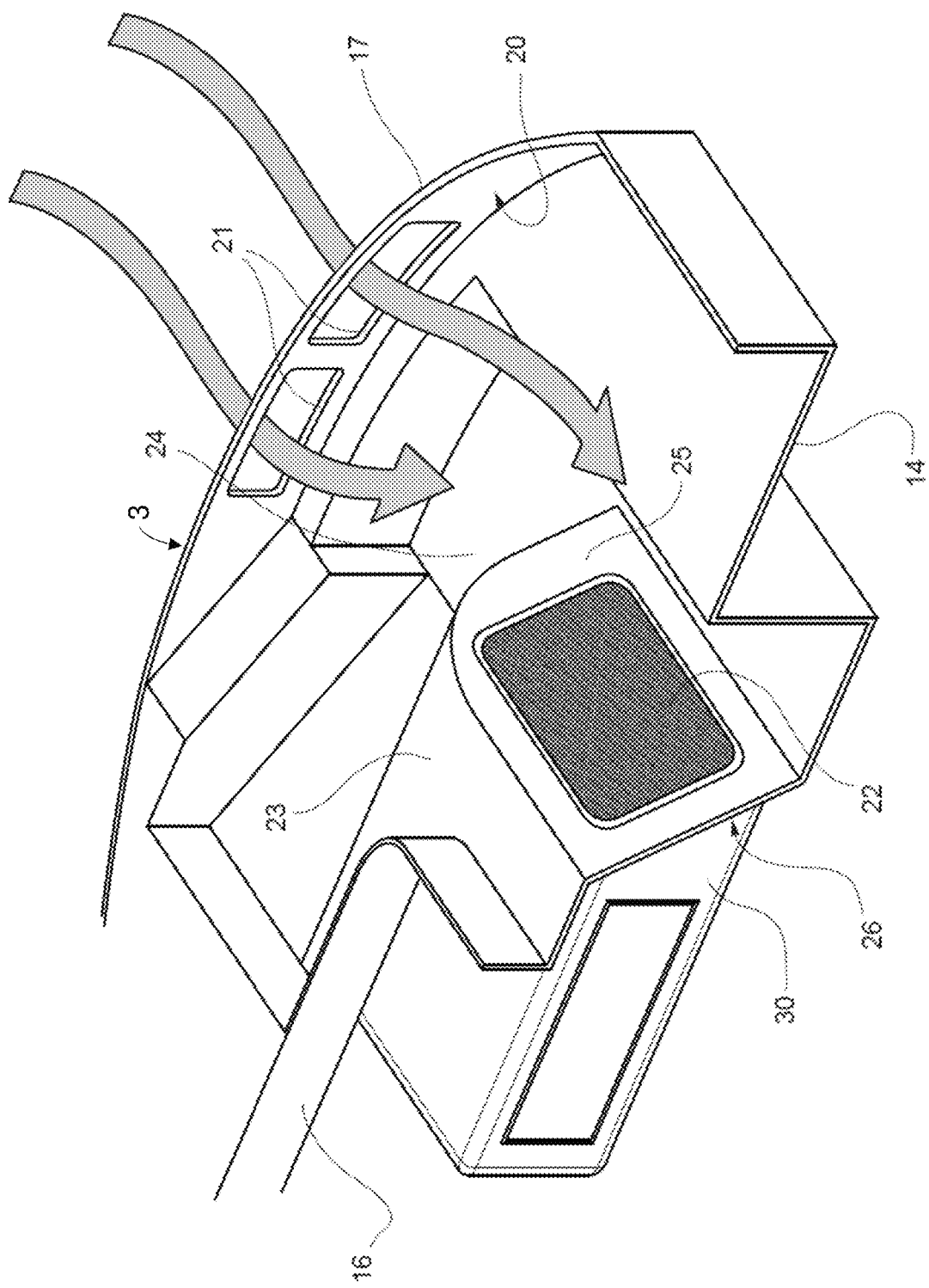
FIG. 3 is a perspective view of a portion of the bodywork, with some parts removed for clarity.

The remaining portion of the wall 14, distinct from the portion 23, is identified in FIG. 3 with the reference number 24.

As can be seen in FIG. 3, the portion 23 comprises a flat zone 25 tilted in relation to the portion 24, on which the opening 22 is formed.

Thus, the opening 22 extends according to an ideal surface corresponding to an ideal continuation of the flat zone 25; a line orthogonal to the flat zone 25 or to the ideal surface is directed towards one side of the motor vehicle 1. The latter line is coplanar to the axis B and, thus, defines with it a plane, in turn orthogonal to the forward direction. Thus, the line that is orthogonal to the flat zone 25 or to the ideal surface belongs to a plane orthogonal to the forward direction.

The flat zone 25 is a particular example, but could be replaced by a corresponding zone that is not flat. In this case, a tangent plane would, in any case, exist. This tangent plane would have the same properties as the flat zone 25.

As can be seen in FIG. 3, the opening 22 communicates, in particular directly, with a housing 26 defined by the bodywork 3; the housing 26 comprises the above-mentioned recess with a seat function.

The housing 26 is separate from the passenger compartment 2. In particular, the bodywork 2 comprises a firewall 27 that divides the housing 26 from the passenger compartment 2.

The housing 26 is arranged at the front of the passenger compartment 2, according to the forward direction of the motor vehicle 1.

Thus, the housing 26 communicates with the duct 20 through the opening 22.

The motor vehicle 1 comprises an air conditioning device 30 configured to air condition the passenger compartment 2, i.e., to cool or heat the passenger compartment 2.

The device 30 is known in the prior art; thus, it will not be described in further detail.

The device 30 is arranged inside the housing 26, or is contained therein.

The device 30 conditions the air contained in the housing 26 and pumps it into the passenger compartment 2.

Thus, the firewall 27 is provided with enough ducts, not illustrated, to enable the device 30 to pump air into the passenger compartment 2.

During the operation of the motor vehicle 1, the relative movement between the motor vehicle 1 and the surrounding air causes an airflow from the outside of the motor vehicle 1 towards the openings 21.

Thus, the airflow spreads in the duct 20 and reaches the opening 22, thus entering the housing 26.

Here, the air conditioning device 30 receives the air that has passed through the duct 20 and conditions it, with the purpose of air conditioning the passenger compartment 2.

From the above, the advantages of the bodywork 3 according to the invention are clear.

Figure 2:
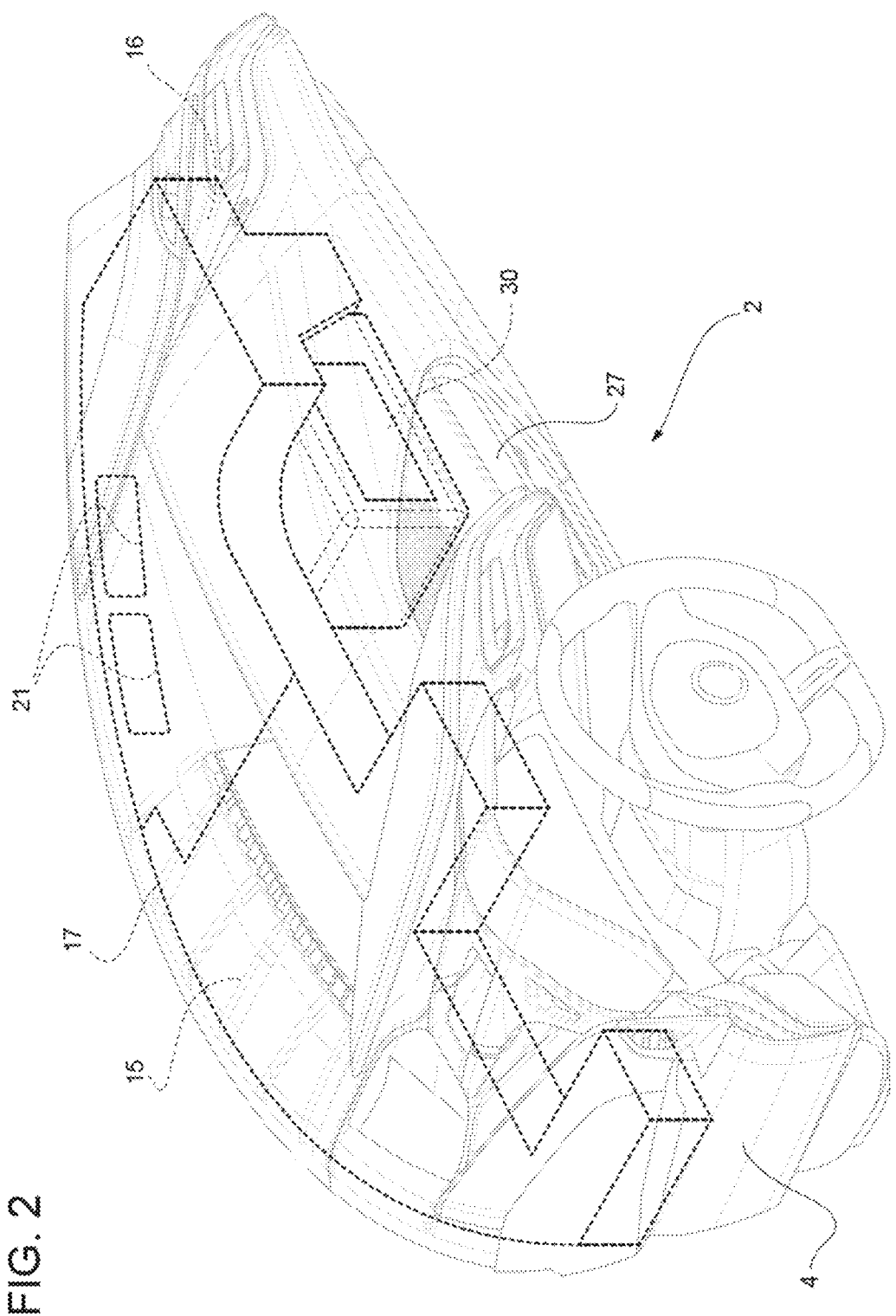
FIG. 2 is a perspective view of the motor vehicle from the inside of its passenger compartment.

As can be seen in FIGS. 1, 2, and 3, the crossbar 11 extends completely above the air conditioning device 30 and the housing 26.

Despite this, the opening 22 constitutes the air intake for the air conditioning device 30. This intake receives air via the duct 20 and the openings 21 without any type of obstruction.

In this way, the crossbar 11 and, more generally, the bodywork 3 have been able to be designed with great freedom, without the drawback represented by the obstruction of the air intake.

In any case, the bodywork 3 remains compact and simple.

Finally, it is clear that changes may be made to the bodywork 3 according to the invention, and variations produced thereto, that, in any case, do not depart from the scope of protection defined by the claims.

In particular, the number and shape of the components described and illustrated could be different to and, in particular, varied with great freedom.

The invention claimed is:

1. A bodywork (3) for a motor vehicle (1), the bodywork (3) comprising a frame (10) to fix and surround a windshield (6) of the motor vehicle (1), wherein the frame (10) comprises:
   a crossbar (11) to constitute a support base for the windshield (6), and
   a pair of uprights (12) respectively fixed at opposite ends of the crossbar (11) so as to form an area with a closed contour for placing the windshield (6),
   wherein the crossbar (11) comprises a first wall (14) facing away from said area, characterized in that it comprises a duct (20) extending through the crossbar (11) between a first opening (21) obtained on a second wall (17) of the crossbar (11) and a second opening (22) obtained on the first wall (14); and
   a housing (26) communicating with the duct (20) through the second opening (22) and suitable for containing an air conditioning device (30) to condition a passenger compartment (2) of the motor vehicle (1).

2. The bodywork according to claim 1, wherein the second wall (17) extends so as to be transversely incident to the first wall (14).

3. The bodywork according to claim 1, wherein the first wall comprises a concave portion (23), which is concave towards the opposite side with respect to said area, the second opening (22) being obtained on the concave portion (23).

4. The bodywork according to claim 3, wherein the concave portion (23) comprises a flat zone (25) inclined relative to a further portion (24) of the first wall (14) distinct from the concave portion (23), the second opening (22) being obtained on the flat zone (25).

5. The bodywork according to claim 1, wherein the duct (20) is defined by a chamber completely obtained inside the crossbar (11).

6. A motor vehicle (1) having a forward moving direction and comprising:
   a bodywork (3) according to claim 1,
   a windshield (6) fixed to the frame (10) of the bodywork (3) so as to be surrounded by said closed contour, and
   a passenger compartment (2) defined by the bodywork (3) and an air conditioning device (30) configured to condition the passenger compartment (2), wherein the bodywork (3) further defines a housing (26) distinct from the passenger compartment (2), containing the air conditioning device (30) and communicating with the duct (20) through the second opening (22), so that the air conditioning device (30) can receive air flowing through the duct (20);
   wherein said first wall (14) is transversal relative to an axis orthogonal to the forward moving direction.

7. The motor vehicle according to claim 6, wherein the second wall (17) is transversal relative to the forward moving direction.

8. The motor vehicle according to claim 6, wherein the first opening (21) communicates with the outside so that air can flow into the duct (20) towards the housing (26).

9. The motor vehicle according to claim 6, wherein the second opening (22) extends according to an ideal surface having a tangent plane; wherein the tangent plane is orthogonal to a straight line belonging to a plane orthogonal to the forward moving direction.

10. The motor vehicle (1) according to claim 6, wherein the second wall (17) extends so as to be transversely incident to the first wall (14).

11. The motor vehicle (1) according to claim 6, wherein the duct (20) is defined by a chamber completely obtained inside the crossbar (11).

12. A bodywork (3) for a motor vehicle (1), the bodywork (3) comprising a frame (10) to fix and surround a windshield (6) of the motor vehicle (1), wherein the frame (10) comprises:
   a crossbar (11) to constitute a support base for the windshield (6); and
   a pair of uprights (12) respectively fixed at opposite ends of the crossbar (11) so as to form an area with a closed contour for placing the windshield (6);
   wherein the crossbar (11) comprises a first wall (14) facing away from the area, characterized in that it comprises a duct (20) extending through the crossbar (11) between a first opening (21) obtained on a second wall (17) of the crossbar (11) and a second opening (22) obtained on the first wall (14); and
   wherein the first wall (14) comprises a concave portion (23), which is concave towards the opposite side with respect to the area, the second opening (22) being obtained on the concave portion (23).

13. The bodywork (3) according to claim 12, wherein the second wall (17) extends so as to be transversely incident to the first wall (14).

14. The bodywork (3) according to claim 12, wherein the duct (20) is defined by a chamber completely obtained inside the crossbar (11).

15. The bodywork according to claim 12, wherein the concave portion (23) comprises a flat zone (25) inclined relative to a further portion (24) of the first wall (14) distinct from the concave portion (23), the second opening (22) being obtained on the flat zone (25).

* * * * *